(12) United States Patent
Gerard

(10) Patent No.: US 7,204,562 B2
(45) Date of Patent: Apr. 17, 2007

(54) WHEEL CLAD ASSEMBLY

(75) Inventor: Philip O. Gerard, Ada, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 10/689,229

(22) Filed: Oct. 20, 2003

(65) Prior Publication Data

US 2005/0073191 A1    Apr. 7, 2005

Related U.S. Application Data

(60) Provisional application No. 60/420,704, filed on Oct. 23, 2002.

(51) Int. Cl.
*B60B 7/00* (2006.01)

(52) U.S. Cl. .................. 301/37.43; 301/37.11

(58) Field of Classification Search .......... 301/37.101, 301/37.26, 37.27, 37.28, 37.102, 37.31–37.35, 301/37.11, 37.106, 108.1, 108.3, 37.43, 37.36
See application file for complete search history.

(56) References Cited

U.S. PATENT DOCUMENTS

| | | | |
|---|---|---|---|
| 2,217,086 | A | 10/1940 | Whitacre |
| 2,819,929 | A | 1/1958 | Hunt |
| 3,998,494 | A | 12/1976 | Spisak |
| 4,123,111 | A | 10/1978 | Renz et al. |
| 4,133,583 | A | 1/1979 | Spisak |
| 4,183,587 | A | 1/1980 | Spisak |
| 4,217,003 | A | 8/1980 | Main |
| 4,316,638 | A | 2/1982 | Spisak |
| 4,357,053 | A | 11/1982 | Spisak |
| 4,382,635 | A | 5/1983 | Brown et al. |
| 4,457,560 | A | 7/1984 | Rowe et al. |
| 4,458,952 | A | 7/1984 | Foster et al. |
| 4,530,542 | A * | 7/1985 | Spiegel et al. .......... 301/37.376 |
| 4,547,021 | A | 10/1985 | Abbate Daga |
| 4,707,035 | A | 11/1987 | Kondo et al. |
| 4,822,109 | A | 4/1989 | Feria |
| 4,842,339 | A | 6/1989 | Roulinson |
| 4,917,441 | A * | 4/1990 | Iida ......................... 301/37.36 |
| 4,974,909 | A * | 12/1990 | Patti et al. ............... 301/37.31 |
| 5,112,112 | A | 5/1992 | Baba |
| 5,163,739 | A | 11/1992 | Stanlake |
| 5,297,854 | A | 3/1994 | Nielsen et al. |

(Continued)

FOREIGN PATENT DOCUMENTS

| | | |
|---|---|---|
| EP | 0087607 | 9/1983 |
| GB | 2054483 | 2/1981 |
| JP | 04085102 | 3/1992 |

*Primary Examiner*—Jason R. Bellinger
(74) *Attorney, Agent, or Firm*—Price, Heneveld, Cooper, DeWitt & Litton, LLP

(57) ABSTRACT

A composite wheel that includes a wheel having an outer surface, a plurality of exposed apertures formed in a circular pattern in a central hub region of the wheel, and a centrally-located hub aperture extending through the wheel. The composite wheel also includes a wheel cladding having a body conforming to the outer surface of the wheel, an exposed outer surface, and an inner surface facing the wheel when the wheel cladding is attached to the wheel. The wheel cladding includes at least one alignment tab extending from the inner surface and engaging the hub aperture and aligning the cladding with respect to the hub aperture, and at least one support post extending from the inner surface substantially proximate the hub aperture and structurally supporting the wheel cladding with respect to the wheel.

33 Claims, 4 Drawing Sheets

U.S. PATENT DOCUMENTS

| | | | |
|---|---|---|---|
| 5,346,288 A * | 9/1994 | Hodge et al. | 301/37.371 |
| 5,368,370 A | 11/1994 | Beam | |
| 5,564,791 A | 10/1996 | Chase et al. | |
| 5,577,809 A | 11/1996 | Chase | |
| 5,597,213 A | 1/1997 | Chase | |
| 5,630,654 A | 5/1997 | Chase | |
| 5,636,906 A | 6/1997 | Chase | |
| 5,707,113 A | 1/1998 | Russell | |
| 5,803,552 A * | 9/1998 | Kato et al. | 301/37.41 |
| 5,845,973 A | 12/1998 | Chase | |
| 6,022,081 A | 2/2000 | Hauler et al. | |
| 6,039,406 A | 3/2000 | Sheu | |
| 6,082,829 A | 7/2000 | Chase | |
| 6,152,538 A | 11/2000 | Ferriss et al. | |
| 6,209,204 B1 | 4/2001 | Eikhoff | |
| 6,238,007 B1 | 5/2001 | Wieczorek et al. | |
| 6,402,254 B1 | 6/2002 | Eikhoff et al. | |
| 6,443,531 B1 | 9/2002 | Hogan et al. | |
| 6,457,781 B1 | 10/2002 | Cutcher et al. | |
| 6,637,832 B2 * | 10/2003 | Wrase et al. | 301/37.31 |
| 6,663,189 B2 * | 12/2003 | Enomoto et al. | 301/37.36 |
| 6,672,676 B2 * | 1/2004 | Zaniboni | 301/37.101 |
| 6,755,485 B1 * | 6/2004 | Chase | 301/37.43 |
| 6,779,852 B2 * | 8/2004 | Van Houten et al. | 301/37.43 |

* cited by examiner

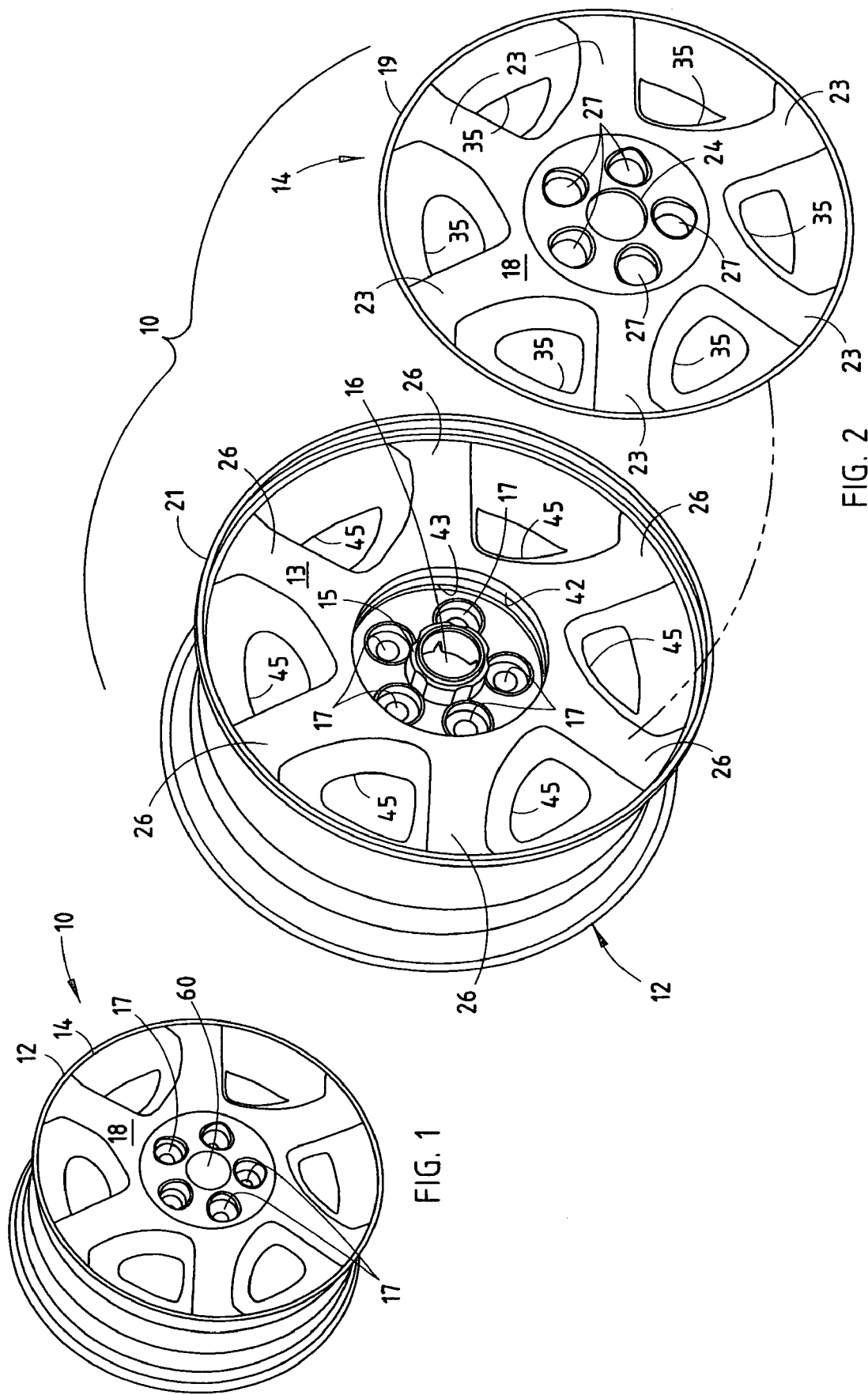

WHEEL CLAD ASSEMBLY

CROSS REFERENCE TO RELATED APPLICATION

This application claims the benefit of U.S. Provisional Application No. 60/420,704, filed Oct. 23, 2002, entitled WHEEL CLAD ASSEMBLY.

BACKGROUND OF THE INVENTION

The present invention relates to vehicle wheels, and particularly to a composite wheel including a metal with a polymeric decorative cladding.

Ornamental metal-plated polymeric claddings have been employed for providing a decorative surface to the outer exposed surface of wheels for several years. U.S. Pat. Nos. 5,564,791; 5,577,809; 5,597,213; 5,630,654; 5,636,906; 5,845,973; and 6,085,829, the disclosures of which are incorporated herein by reference, represent different approaches for providing and attaching such claddings to existing wheels to provide a finished decorative appearing wheel. These wheel claddings offer design flexibility in that wheel claddings of various configurations may be used to cover a single style wheel.

Existing methods of attaching cladding to an underlying metal wheel include the use of an adhesive between the wheel and the cladding in localized areas. During curing of such adhesive, the wheel cladding is temporarily held to the wheel using the secondary cure caps that clamp the cladding to the wheel for a period of up to 24 hours. Some wheel designs provide a thick central hub that includes a means for fastening the cladding and the wheel together. However, such designs use a significant amount of material to construct the portion of the wheel surrounding the central hub, thereby increasing the overall weight of the wheel as well as the cost associated therewith. A center cap, also part of the cladding, is then placed within a center aperture of the wheel and is connected directly thereto.

This arrangement of the wheel, the cladding and the cladding center cap may cause problems when attempting to service the associated vehicle, and specifically when attempting to balance the tires thereof. In short, typical methods of balancing each tire include utilizing a tire-balancing machine that includes supporting the tire, wheel and cladding assembly upon a cone-shaped support positioned within the central apertures of the wheel and the cladding. Typically, the cone-shape support contacts the central aperture of the cladding, and centers the assembly within the balancing machine with respect thereto. As a result, the location of the central aperture of the cladding with respect to the wheel is highly critical. Another characteristic of typical tire-balancing equipment is the significant load placed on the cladding in the area surrounding the central aperture when the tire, wheel and cladding assembly are "clamped" within the equipment. Heretofore, the design of the wheel and the cladding have avoided loading the wheel cladding within the wheel and tire assembly during the balancing process, as loading the cladding would cause significant deflection of the cladding as the cladding pressure is increased, thereby effecting the tire balancing process.

A wheel and cladding design is desired that reduces the material required to manufacture the wheel, allows for precise alignment of the central aperture of the cladding with respect to the wheel, provides proper depth alignment of the cladding with respect to the wheel, and provides structural support for the cladding during subsequent tire-balancing processes.

SUMMARY OF THE INVENTION

One aspect of the present invention is to provide a composite wheel that includes a wheel having an outer surface, a plurality of exposed apertures formed in a circular pattern in a central hub region of the wheel, and a centrally located hub aperture extending through the wheel. The composite wheel also includes a wheel cladding having a body conforming to the outer surface of the wheel, an exposed decorative outer surface, and an inner surface facing the wheel when the wheel cladding is attached to the wheel. The wheel cladding includes at least one alignment tab extending from the inner surface and engaging the hub aperture and aligning the cladding with respect to the hub aperture, and at least one support post extending from the inner surface substantially proximate the hub aperture and structurally supporting the wheel cladding with respect to the wheel.

Another aspect of the present invention is to provide a wheel cladding assembly that includes a body member adapted to conform to the outer surface of a wheel, wherein the body member has an exposed decorative outer surface and an inner surface and includes at least one alignment tab extending from the inner surface for engaging the hub aperture and adapted to align the body member with respect to a hub aperture centrally located within the wheel, and a centrally-located aperture. The wheel cladding assembly also includes a cap member located within the central aperture of the wheel cladding and operably connected to the wheel cladding.

Still yet another aspect of the present invention is to provide a wheel cladding assembly that includes a body portion attachable to the outer surface of a wheel, wherein the body portion has an exposed outer surface, an inner surface and a centrally located hub aperture. The wheel cladding assembly also includes at least one alignment tab extending from the inner surface of the body portion for engaging a hub aperture of a wheel and adapted to align the body portion with respect to the wheel. The wheel cladding assembly further includes at least one support post extending from the inner surface of the body portion substantially proximate the hub aperture of the body portion and adapted to structurally support the body portion with respect to the wheel.

The present inventive wheel and wheel cladding assembly reduces the amount of material required to construct the wheel, provides increased accuracy of the alignment of the central aperture of the wheel cladding with respect to the wheel, provides proper depth alignment of the wheel cladding with respect to the wheel, and provides proper structural support for the wheel cladding during typical tire-balancing processes. Moreover, the composite wheel and wheel cladding assembly reduce the associated manufacturing costs, can be easy and quickly assembled, are efficient to use, are more economical to manufacture, are capable of a long-operating life, and are particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1 is a perspective view of a composite wheel and decorative cladding embodying the present invention;

FIG. 2 is an exploded perspective view of the wheel and the cladding;

DETAILED DESCRIPTION OF THE PREFERRED EMBODIMENTS

Figure 4:
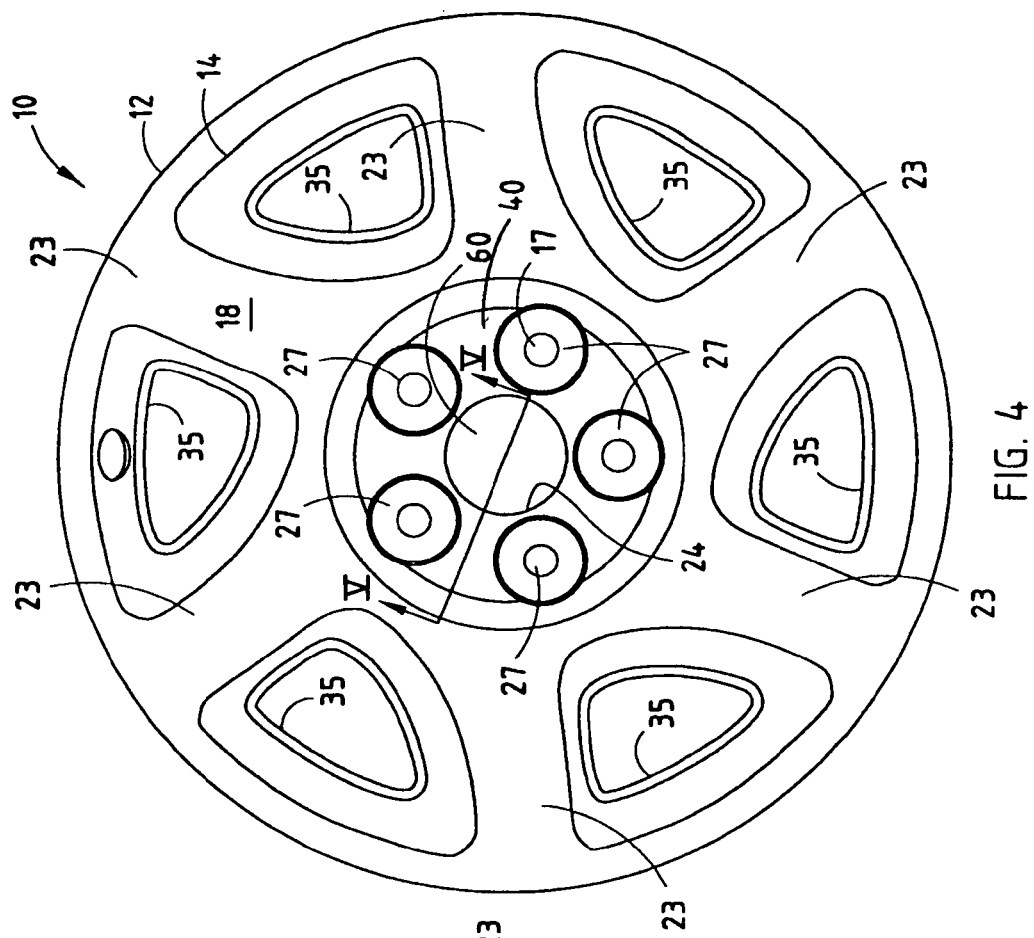
FIG. 4 is a front elevational view of the wheel and the cladding.
Figure 3:
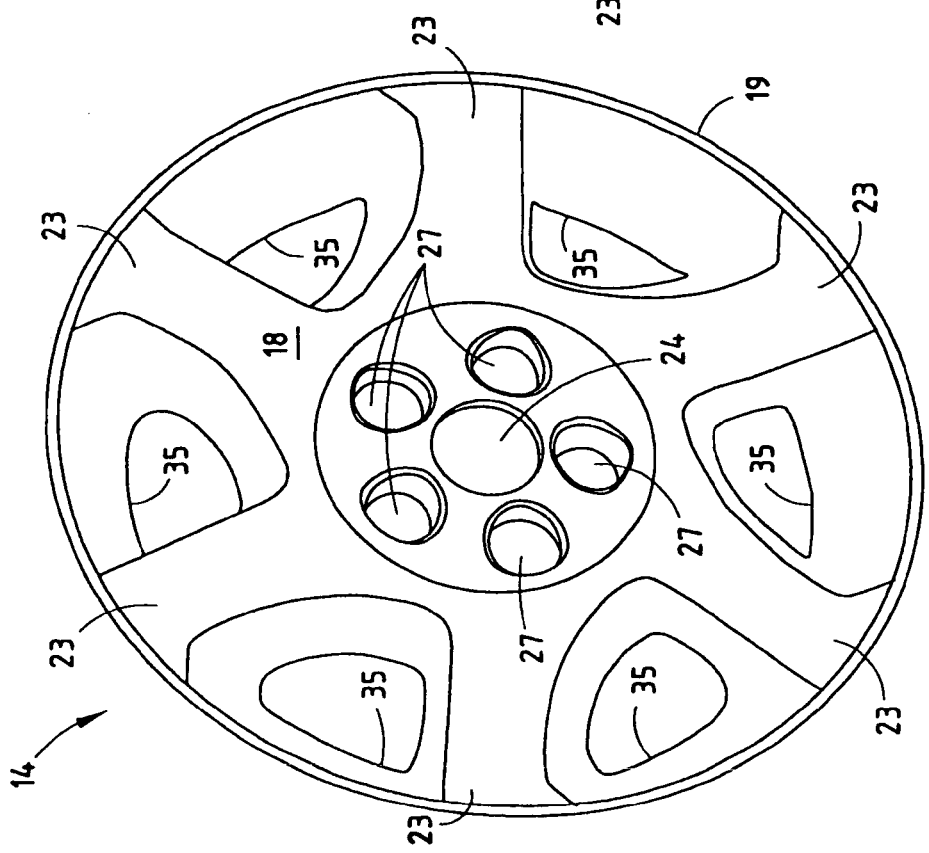
FIG. 3 is a perspective view of the cladding.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1–4) generally designates a composite wheel comprising a wheel 12 made of aluminum, magnesium, steel, or other material conventionally used for manufacturing vehicle wheels. The composite wheel 10 is made by bonding a wheel cladding 14 to the otherwise outer exposed surface 13 of the wheel 12. The cladding 14 is injection molded of a polymeric material, such as a combination of polycarbinate and ABS having an average thickness of within the range of from about 2 mm to about 4 mm. The polycarbinate to ABS ratio ranges from about 60% to about 70% polycarbinate and about 40% to about 30% ABS, respectively. Other polymeric materials or composite polymeric materials may also be used. An outer decorative surface 18 of the cladding 14 is covered with a shiny or satin finished metal plating, such as chrome as described in U.S. patent application Ser. No. 09/707,866 filed Nov. 7, 2000, now U.S. Pat. No. 6,749,946, and entitled METHOD AND COMPOSITION FOR METALLIC FINISHES, the disclosure of which is incorporated herein by reference. The outer surface 18 of the cladding 14 can also be painted, textured or otherwise finished for a particularly desired appearance.

Figure 5:
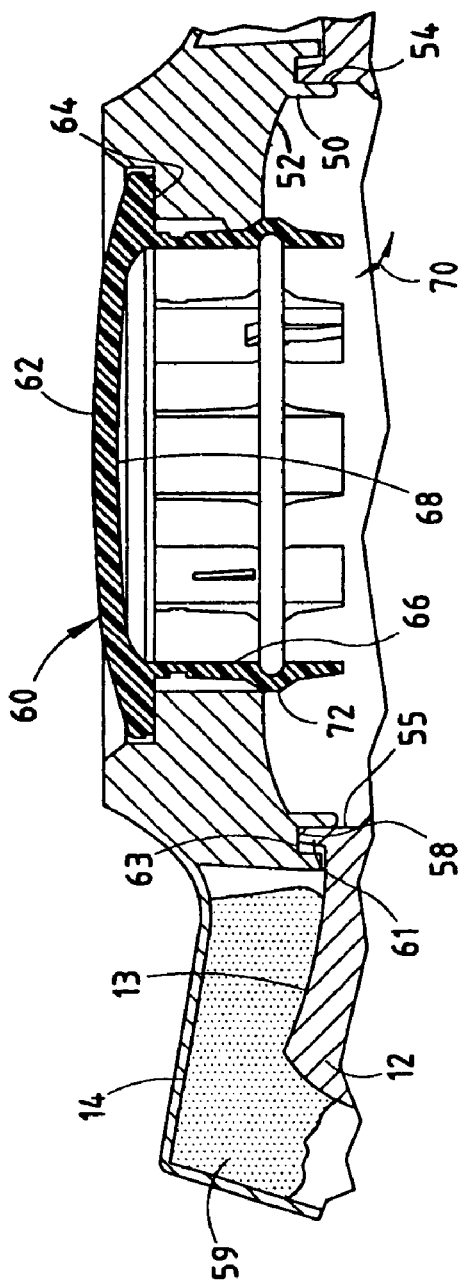
FIG. 5 is a cross-sectional partial side elevational view of the wheel and the cladding, including a cap member, taken along the line V—V, FIG. 4.

The wheel 12 is of the type which has a small central opening or hub aperture 16 located within a wheel hub 15 of the wheel 12 and which defines an aperture wall 55 (FIG. 5), and a plurality of exposed lugnut apertures 17 arranged in a circular pattern and spaced for the particular vehicle on which the composite wheel 10 is to be employed. The lugnuts (not shown) as associated with the composite wheel 10 are typically exposed once the wheel 10 is mounted to a vehicle. The wheel 12 further includes a raised support surface 61 extending circumferentially about the hub aperture 16, located substantially proximate the hub aperture 16, and extending outwardly from the outer surface 13. The support surface 61 includes a machined mounting surface 63.

The wheel cladding 14 has a geometry which substantially conforms to that of the wheel 12, namely, a rim 19 which matingly fits within or on top of a rim 21 of the wheel 12. The cladding 14 includes a plurality of spokes 23 extending radially outward from a centrally-located hub aperture 24 which correspond in size, shape and location to a plurality of spokes 26 of the wheel 12. Located between the spokes 23 of the cladding 14 are a plurality of openings 35 that are shaped to conform to a plurality of corresponding openings 45 of the wheel 12. A recessed central hub area 40 surrounds the central aperture 24 of the cladding 14, that also includes a plurality of lugnut receiving apertures 27 which align with and fit within the apertures 17 of the wheel 12 when the wheel cladding 14 is assembled with the wheel 12. The central aperture 24 is aligned with the aperture 16 in the wheel hub 15, when the wheel cladding 14 is assembled with the wheel 12. As a result, the wheel cladding 14 appears as an integral part of the outer surface of the wheel 12, as seen in FIG. 1.

Figure 6:
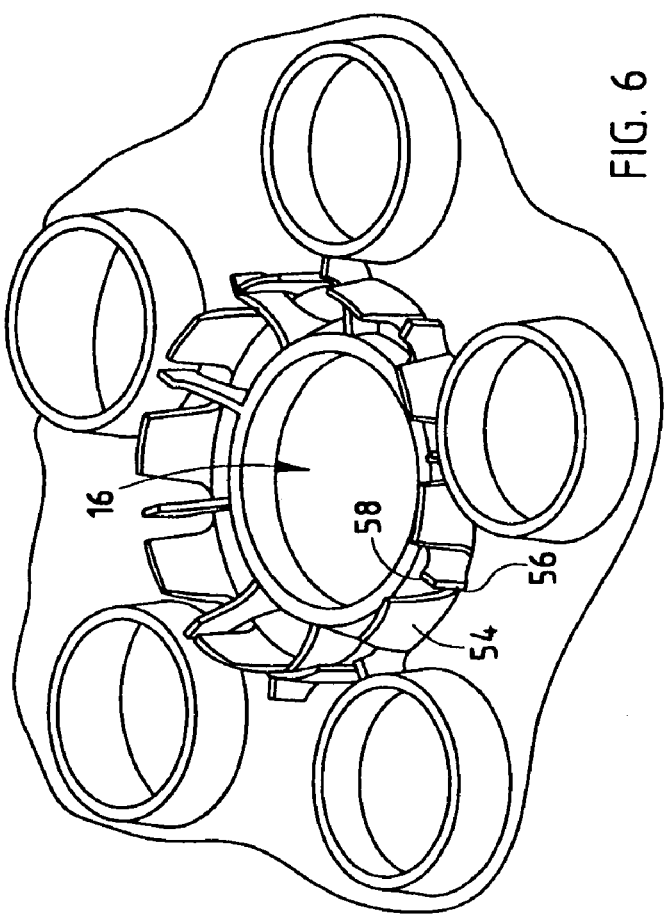
FIG. 6 is a partial perspective view of the cladding.

The wheel cladding 14 (FIGS. 5 and 6) further includes a plurality of alignment tabs 50 spaced circumferentially about the central aperture 24 and extending outwardly from an inner surface 52 of the wheel cladding 14. Each tab 50 includes an outer abutment surface 54 that abuts the inner wall 55 of the hub aperture 16 of the wheel 12 when the wheel cladding 14 is assembled with the wheel 12, as described below. A plurality of supporting posts 56 are spaced circumferentially about the central aperture 24 of the wheel cladding 14 and interspaced among the alignment tabs 50. Each supporting post 56 includes a supporting surface 58 that abuts the outer surface 13 of the wheel 12 when the wheel cladding 14 is assembled with the wheel 12, as described below.

In assembly, the cladding 14 is bonded to the wheel 12 by providing continuous or segmented beads of suitable bonding adhesives such as a RTV (silicone adhesive) 59, which is placed on the inner surface 52 continuously or in sections around the rim 19 of the wheel 12, around each of the wheel openings 35, and in the area surrounding the central aperture 24 where the inner surface 52 of the cladding 14 and the outer surface 13 of the wheel 12 are in contact. Other adhesives, such as two component urethane, epoxy, or other adhesives suitable for the automotive wheel environment may be employed. Once a bead of adhesive is applied either to the inner surface 32 of the cladding 14 or the outer surface 13 of the wheel 12, the wheel cladding 14 is aligned with the wheel 12 by aligning the plurality of alignment tabs 50 within the hub aperture 16 such that the outer surface 54 of the each alignment tab 50 abuts the inner wall 55 of the hub aperture 16, thereby positively aligning the wheel cladding 14 with the wheel 12. The wheel cladding 14 is then pressed inwardly until the supporting surface 58 of each supporting post 56 abuts the mounting surface 63 of the raised surface 61, thereby providing proper depth alignment of the wheel cladding 14 with respect to the wheel 12.

Figure 8:
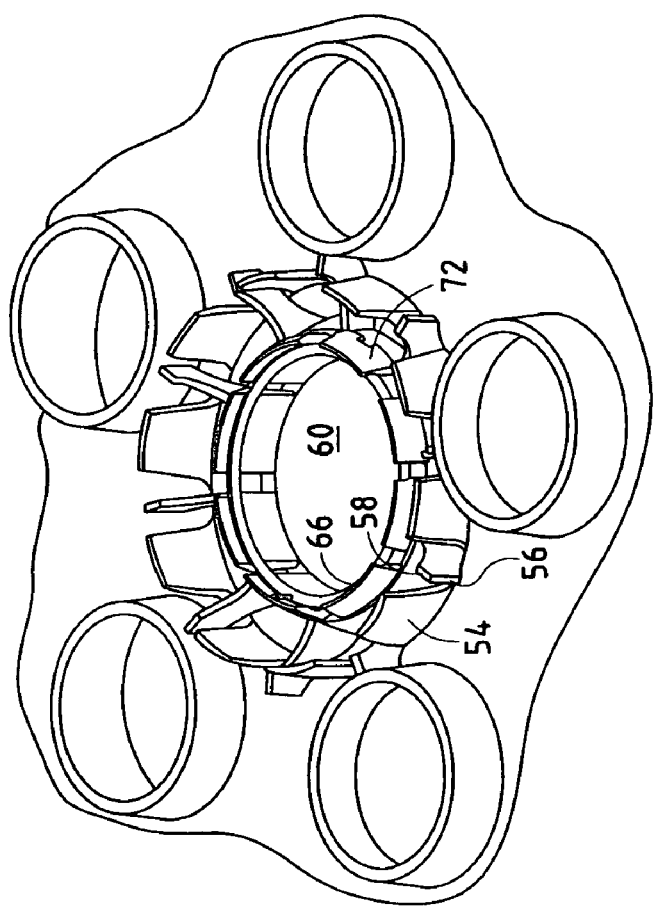
FIG. 8 is an enlarged perspective view of the cladding assembled with the cap member.
Figure 7:
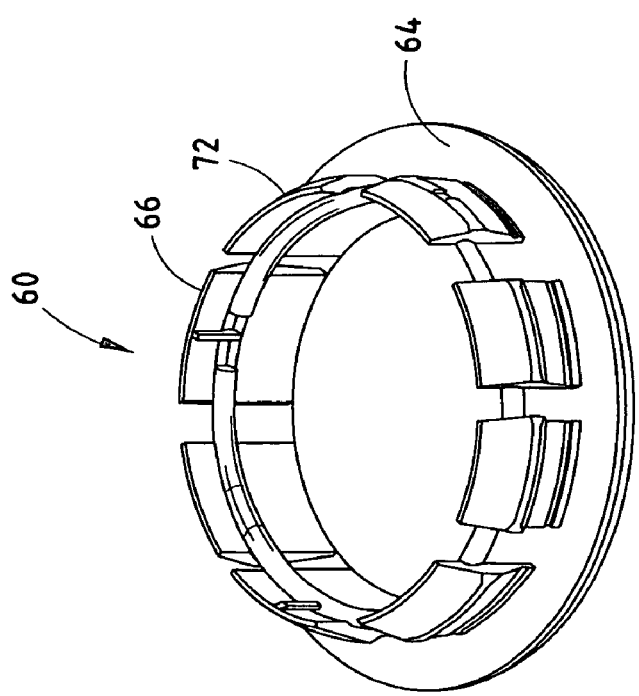
FIG. 7 is a perspective view of the cap member.

The wheel cladding assembly 11 still further includes a cap member 60 (FIGS. 7 and 8) snappably connected to the wheel cladding 14 within the central aperture 24 thereof. The cap member 60 includes a top portion 62 having an outwardly radially extending lip 64, and a plurality of engagement tabs 66 extending outwardly from an inner surface 68 thereof. Each engagement tab 66 is flexible in a direction as indicated by directional arrow 70 and includes an outwardly extending shoulder 72 spaced along the length thereof. In assembly, the cap member 60 is assembled with the wheel cladding 14 by press fitting the engagement tabs 66 within the central aperture 24, thereby causing the engagement tabs 66 to deflect in an inward direction, until each shoulder 72 engages the inner surface 52 of the wheel cladding 14. The snap-type fit of the cap member 60 with the wheel cladding 14 allows the cap member 60 to be easily removed from engagement with the wheel cladding 14, thereby providing access to the underlying vehicle hub (not shown).

The present inventive wheel and wheel cladding assembly reduces the amount of material required to construct the wheel, provides increased accuracy of the alignment of the central aperture of the wheel cladding with respect to the wheel, provides proper depth alignment of the wheel cladding with respect to the wheel, and provides proper structural support for the wheel cladding during typical tire-balancing processes.

In the foregoing description, it will be readily appreciated by those skilled in the art that modifications may be made to the invention without departing from the concepts disclosed herein. Such modifications are to be considered as includes in the following claims, unless these claims by their language expressly state otherwise.

The invention claimed is:

1. A composite wheel, comprising:
a wheel having an outer surface, a plurality of exposed apertures formed in a circular pattern in a central hub region of the wheel, and a centrally located hub aperture extending through the wheel; and
a wheel cladding including a body substantially conforming to the outer surface of the wheel, the wheel cladding having an exposed outer surface and an inner surface facing the wheel when the wheel cladding is attached to the wheel, the wheel cladding including at least one alignment tab extending from the inner surface for engaging the hub aperture and aligning the cladding with respect to the hub aperture, wherein the at least one alignment tab includes a plurality of tabs spaced radially about the hub aperture when the cladding is attached to the wheel and at least one support post extending from the inner surface proximate the hub aperture and structurally supporting the wheel cladding with respect to the wheel.

2. The composite wheel of claim 1, wherein the at least one support post includes a plurality of support posts spaced radially about the hub aperture when the cladding is attached to the wheel.

3. The composite wheel of claim 1, further including:
a cap member located within an aperture centrally located within the wheel cladding, and wherein the cap member is operably connected to the wheel cladding.

4. The composite wheel of claim 3, wherein the cap member is operably connected to the wheel cladding by a snap-type fit connection.

5. The composite wheel of claim 3, wherein the cap member includes at least one engagement tab that snappingly engages the wheel cladding.

6. The composite wheel of claim 5, wherein the at least one engagement tab of the cap member includes a plurality of engagement tabs each including a shoulder that engages the inner surface of the wheel cladding.

7. A composite wheel, comprising:
a wheel having an outer surface, a support surface extending outwardly from the outer surface of the wheel, a plurality of exposed apertures formed in a circular pattern in a central hub region of the wheel, and a centrally located hub aperture extending through the wheel; and
a wheel cladding including a body substantially conforming to the outer surface of the wheel, the wheel cladding having an exposed outer surface and an inner surface facing the wheel when the wheel cladding is attached to the wheel, the wheel cladding including at least one alignment tab extending from the inner surface for engaging the hub aperture and aligning the cladding with respect to the hub aperture, and at least one support post extending from the inner surface proximate the hub aperture and structurally supporting the wheel cladding with respect to the wheel, and wherein the support posts abut the raised support surface.

8. The composite wheel of claim 7, wherein the support surface extends circumferentially about the hub aperture.

9. A wheel cladding assembly, comprising:
a body member adapted to conform to an outer surface of a wheel, the body member having an exposed outer surface, an inner surface and a plurality of circumferentially-spaced lug apertures, and including at least one alignment tab extending from the inner surface and located radially inward of the lug apertures for engaging a hub aperture centrally located within a wheel and adapted to align the body member with respect to the hub aperture, and a centrally located aperture, wherein the at least one alignment tab includes a plurality of alignment tabs spaced to abut a wheel about the circumference of a central aperture of a wheel; and
a cap member located within the central aperture of the wheel cladding and operably connected to the wheel cladding.

10. The wheel cladding assembly of claim 9, wherein the cap member is operably connected to the body member by a snap-type fit connection.

11. The wheel cladding assembly of claim 9, wherein the cap member includes at least one engagement tab that snappingly engages the wheel cladding.

12. The wheel cladding assembly of claim 11, wherein the at least one engagement tab of the cap member includes a plurality of engagement tabs each including a shoulder that engages the inner surface of the body member.

13. A wheel cladding assembly, comprising:
a body member adapted to conform to an outer surface of a wheel, the body member having an exposed outer surface, an inner surface and a plurality of circumferentially-spaced lug apertures, and including at least one alignment tab extending from the inner surface and located radially inward of the lug apertures for engaging a hub aperture centrally located within a wheel and adapted to align the body member with respect to the hub aperture, and a centrally located aperture, wherein the body member further includes at least one support post extending from the inner surface and adapted to abut an outer surface of a wheel; and
a cap member located within the central aperture of the wheel cladding and operably connected to the wheel cladding.

14. A wheel cladding assembly, comprising:
a body member adapted to conform to an outer surface of a wheel, the body member having an exposed outer surface, an inner surface and a plurality of circumferentially-spaced lug apertures, and including at least one alignment tab extending from the inner surface and located radially inward of the lug apertures for engaging a hub aperture centrally located within a wheel and adapted to align the body member with respect to the hub aperture, at least one support post of the body member that is adapted to abut a raised support surface extending axially outwardly from an outer surface of a wheel, and a centrally located aperture; and a cap member located within the central aperture of the wheel cladding and operably connected to the wheel cladding.

15. A wheel cladding assembly, comprising:

a body portion attachable to an outer surface of a wheel, the body portion having an exposed outer surface, an inner surface, and a centrally located hub aperture;

at least one alignment tab extending from the inner surface of the body portion for engaging a hub aperture of a wheel and adapted to align the body portion with respect to a wheel, wherein the at least one alignment tab includes a plurality of tabs adapted to be spaced radially about the hub aperture when the cladding is attached to a wheel; and at least one support post extending from the inner surface of the body portion proximate the hub aperture of the body portion and adapted to structurally support the body portion with respect to a wheel.

16. A wheel cladding assembly, comprising:

a body portion attachable to an outer surface of a wheel, the body portion having an exposed outer surface, an inner surface, and a centrally located hub aperture;

at least one alignment tab extending from the inner surface of the body portion for engaging a hub aperture of a wheel and adapted to align the body portion with respect to a wheel; and at least one support post extending from the inner surface of the body portion proximate the hub aperture of the body portion and adapted to structurally support the body portion with respect to a wheel, wherein the at least one support post is adapted to abut a raised support surface of a wheel that extends axially outwardly from an outer surface of a wheel.

17. A wheel cladding assembly, comprising:

a body member adapted to conform to an outer surface of a wheel, the body member having an exposed outer surface and an inner surface, and including at least one support post extending from the inner surface and adapted to abut the outer surface of the wheel proximate a centrally located hub aperture of the wheel, wherein the at least one support post is adapted to be located radially inward of a plurality of apertures formed in a circular pattern of a wheel, and a centrally located aperture; and a cap member located within the central aperture of the wheel cladding and operably connected to the wheel cladding.

18. The wheel cladding assembly of claim 17, wherein the cap member is operably connected to the body member by a snap-type fit connection.

19. The wheel cladding assembly of claim 17, wherein the cap member includes at least one engagement tab that snappingly engages the wheel cladding.

20. The wheel cladding assembly of claim 19, wherein the at least one engagement tab of the cap member includes a plurality of engagement tabs each including a shoulder that engages the inner surface of the body member.

21. The wheel cladding assembly of claim 17, wherein the at least one support post includes a plurality of support posts spaced to abut the wheel about the circumference of the central aperture of the wheel.

22. A wheel cladding assembly, comprising:

a body member adapted to conform to an outer surface of a wheel, the body member having an exposed outer surface and an inner surface, and including at least one support post extending from the inner surface and adapted to abut the outer surface of the wheel proximate a centrally located hub aperture of the wheel, and a centrally located aperture, wherein the at least one support post of the body member is adapted to abut a raised support surface extending axially outwardly from the outer surface of the wheel; and a cap member located within the central aperture of the wheel cladding and operably connected to the wheel cladding.

23. A composite wheel, comprising:

a wheel having an outer surface, a plurality of exposed apertures formed in a circular pattern in a central hub region of the wheel, and a centrally located hub aperture extending through the wheel; and a wheel cladding including a body substantially conforming to the outer surface of the wheel, the wheel cladding having an exposed outer surface and an inner surface facing the wheel when the wheel cladding is attached to the wheel, the wheel cladding including at least one alignment tab extending from the inner surface for engaging the hub aperture and aligning the cladding with respect to the hub aperture, and at least one support post extending from the inner surface proximate the hub aperture to structurally support the wheel cladding with respect to the wheel from axially directed loads applied to the wheel cladding substantially adjacent the hub aperture during wheel balancing, and wherein the at least one support post is located radially inward from the apertures formed in a circular pattern of the wheel when the wheel cladding is attached to the wheel.

24. A wheel cladding assembly, comprising:

a body member adapted to conform to an outer surface of a wheel, the body member having an exposed outer surface, an inner surface and a plurality of circumferentially-spaced lug apertures, and including at least one alignment tab extending from the inner surface and located radially inward of the lug apertures for engaging a hub aperture centrally located within a wheel and adapted to align the body member with respect to the hub aperture, at least one support post adapted to abut a wheel proximate a central aperture of a wheel, wherein the at least one support post is adapted to be located radially inward of a plurality of apertures formed in a circular pattern of a wheel, and a centrally located aperture; and a cap member located within the central aperture of the wheel cladding and operably connected to the wheel cladding.

25. A wheel cladding assembly, comprising:

a body portion attachable to an outer surface of a wheel, the body portion having an exposed outer surface, an inner surface, and a centrally located hub aperture;

at least one alignment tab extending from the inner surface of the body portion for engaging a hub aperture of a wheel and adapted to align the body portion with respect to a wheel; and at least one support post extending from the inner surface of the body portion proximate the hub aperture of the body portion and adapted to structurally support the body portion with respect to a wheel, wherein the at least one support post is adapted to be located radially inward of a plurality of apertures formed in a circular pattern of a wheel.

26. The wheel cladding assembly of claim 25, wherein the at least one support post includes a plurality of support posts adapted to be spaced radially about the hub aperture when the cladding is attached to a wheel.

27. The wheel cladding assembly of claim 25, further including:
   a cap member located within the centrally located aperture of the wheel cladding and operably connected to the wheel cladding.

28. The wheel cladding assembly of claim 27, wherein the cap member is operably connected to the wheel cladding by a snap-type fit connection.

29. The wheel cladding assembly of claim 27, wherein the cap member includes at least one engagement tab that snappingly engages the wheel cladding.

30. The wheel cladding assembly of claim 29, wherein the at least one engagement tab of the cap member includes a plurality of engagement tabs each including a shoulder that engages the inner surface of the wheel cladding.

31. A composite wheel, comprising:
   a wheel having an outer surface, a plurality of exposed apertures formed in a circular pattern in a central hub region of the wheel, and a centrally located hub aperture extending through the wheel; and
   a wheel cladding including a body substantially conforming to the outer surface of the wheel, the wheel cladding having an exposed outer surface and an inner surface facing the wheel when the wheel cladding is attached to the wheel, the wheel cladding including at least one support post extending from the inner surface proximate the hub aperture and structurally supporting the wheel cladding with respect to the wheel, wherein the at least one support post is located radially inward from the apertures formed in a circular pattern of the wheel when the wheel cladding is attached to the wheel.

32. The composite wheel of claim 31, wherein the at least one support post includes a plurality of support posts spaced radially about the hub aperture when the cladding is attached to the wheel.

33. A composite wheel, comprising:
   a wheel having an outer surface, a plurality of exposed apertures formed in a circular pattern in a central hub region of the wheel, and a centrally located hub aperture extending through the wheel; and
   a wheel cladding including a body substantially conforming to the outer surface of the wheel, the wheel cladding having an exposed outer surface and an inner surface facing the wheel when the wheel cladding is attached to the wheel, the wheel cladding including at least one alignment tab extending from the inner surface for engaging the hub aperture and aligning the cladding with respect to the hub aperture, and at least one support post extending from the inner surface proximate the hub aperture to structurally support the wheel cladding with respect to the wheel from axially directed loads applied to the wheel cladding substantially adjacent the hub aperture during wheel balancing, wherein the at least one support post is located radially inward from the apertures formed in a circular pattern of the wheel when the wheel cladding is attached to the wheel.

* * * * *